(12) United States Patent
Baldini

(10) Patent No.: US 8,487,990 B2
(45) Date of Patent: Jul. 16, 2013

(54) METHOD, DEVICE AND SYSTEM FOR POSITIONING A FIRST BODY AND A PART FIXED TO A SECOND BODY WITH RESPECT TO EACH OTHER

(75) Inventor: Alessandro Baldini, Ladispoli (IT)

(73) Assignee: Continental Automotive GmbH, Hannover (DE)

( * ) Notice: Subject to any disclaimer, the term of this patent is extended or adjusted under 35 U.S.C. 154(b) by 749 days.

(21) Appl. No.: 12/648,464

(22) Filed: Dec. 29, 2009

(65) Prior Publication Data

US 2010/0165098 A1   Jul. 1, 2010

(30) Foreign Application Priority Data

Dec. 29, 2008 (EP) .................................... 08022494

(51) Int. Cl.
*H04N 7/18* (2006.01)
(52) U.S. Cl.
USPC .................................. 348/95; 348/90; 348/94
(58) Field of Classification Search
USPC ............................................. 348/95, 90, 94
See application file for complete search history.

(56) References Cited

U.S. PATENT DOCUMENTS

| 6,103,991 | A | * | 8/2000 | Domae et al. | 219/121.69 |
| 7,119,351 | B2 | * | 10/2006 | Woelki | 250/559.4 |
| 2006/0055928 | A1 | | 3/2006 | Chang et al. | 356/400 |

FOREIGN PATENT DOCUMENTS

DE   202005010715 U1   9/2005

OTHER PUBLICATIONS

Extended European Search Report, EP Application No. 08022494. 2-2302, 5 pages, Jun. 12, 2009.

* cited by examiner

*Primary Examiner* — Allen Wong
(74) *Attorney, Agent, or Firm* — King & Spalding L.L.P.

(57) ABSTRACT

In a method for positioning a first body (B1) and a part fixed to a second body (B2), a camera image of a master part (MP) is received. The master part (MP) has a reference marker (RM) and is fixed to the second body (B2). A first position of a pointer on the master part (MP) is determined dependent on the camera image. The pointer is representative for a current position of the first body (B1). A positioning unit (POS) is controlled to move the pointer from the first position to a predetermined second position with respect to the reference marker (RM) dependent on the camera image. The positioning unit (POS) is coupled with the first body (B1) for moving the first body (B1) and the pointer or is coupled with the second body (B2) for moving the second body (B2) and the master part (MP).

11 Claims, 4 Drawing Sheets

METHOD, DEVICE AND SYSTEM FOR POSITIONING A FIRST BODY AND A PART FIXED TO A SECOND BODY WITH RESPECT TO EACH OTHER

CROSS-REFERENCE TO RELATED APPLICATIONS

This application claims priority to EP Patent Application No. 08022494 filed Dec. 29, 2008, the contents of which is incorporated herein by reference in its entirety.

TECHNICAL FIELD

The invention relates to a method, a device and a system comprising the device for positioning a first body and a part fixed to a second body with respect to each other and particularly relates to a positioning of a part in a gripper with respect to a laser head in a laser welding system.

BACKGROUND

With laser welding systems precise welding of parts is possible. However, for this, a position of the part to be processed with respect to the laser head must be very precise. The laser head is therefore positioned manually by an operator. For mass production, this is inefficient.

SUMMARY

According to various embodiments, a method, a device and a system for positioning a first body and a part fixed to a second body with respect to each other can be provided that allows for automatic precise positioning.

According to an embodiment, a method for positioning a first body and a part fixed to a second body with respect to each other, may comprise the steps of:—receiving a camera image of a master part used as the part, the master part having a reference marker and being fixed to the second body such that the reference marker is visible in the camera image and the master part is moveable along with the second body,—determining a first position of a pointer on the master part dependent on the camera image, the pointer being representative for a current position of the first body and being visible in the camera image, and—controlling a positioning unit to move the pointer from the first position to a predetermined second position with respect to the reference marker dependent on the camera image, the positioning unit being coupled with the first body for moving the first body and the pointer or being coupled with the second body for moving the second body and the master part.

According to a further embodiment, the method may further comprise the step of controlling the positioning unit to move the first or the second body or controlling a focusing unit adapted for focusing the pointer to minimize a diameter of the pointer on the master part. According to a further embodiment, the second body may comprise a pointing unit that comprises a laser and the pointer is a reflection of a laser beam emitted by the pointing unit. According to a further embodiment, the first body can be a laser head of a laser welding system. According to a further embodiment, prior to the controlling of the positioning unit the pointer can be moved from the first position to the predetermined second position the master part is checked for a runout. According to a further embodiment, prior to the controlling of the positioning unit the pointer can be moved from the first position to the predetermined second position or prior to checking the master part for a runout a gripper is checked for a runout, the gripper being comprised by the second body and being adapted to fix the part to the second body. According to a further embodiment, the method may further comprise—receiving a camera image of the part that is being fixed to the first body instead of the master part after the positioning of the master part is finished during and/or after processing of the part and—monitoring the processing and/or checking a result of the processing dependent on the camera image of the part.

According to another embodiment, a device for positioning a first body and a part fixed to a second body with respect to each other, may be operable to—receive a camera image of a master part used as the part, the master part having a reference marker and being fixed to the second body such that the reference marker is visible in the camera image and the master part is moveable along with the second body,—determine a first position of a pointer on the master part dependent on the camera image, the pointer being representative for a current position of the first body and being visible in the camera image, and—to control a positioning unit to move the pointer from the first position to a predetermined second position with respect to the reference marker dependent on the camera image, the positioning unit being coupled with the first body for moving the first body and the pointer or being coupled with the second body for moving the second body and the master part.

According to yet another embodiment, a system may comprise a device as described above, and—a first body with a pointing unit for providing a pointer and a camera, the pointer being representative for a current position of the first body and being visible in a camera image of the camera,—a second body with a gripper for fixing a part to the second body, and—a positioning unit being coupled with the first body for moving the first body and the pointer or being coupled with the second body for moving the second body and the part.

According to a further embodiment, the system can be a laser welding system.

BRIEF DESCRIPTION OF THE DRAWINGS

In the following, embodiments are illustrated with reference to the schematic drawings.

The figures are illustrating.

Figure 1:
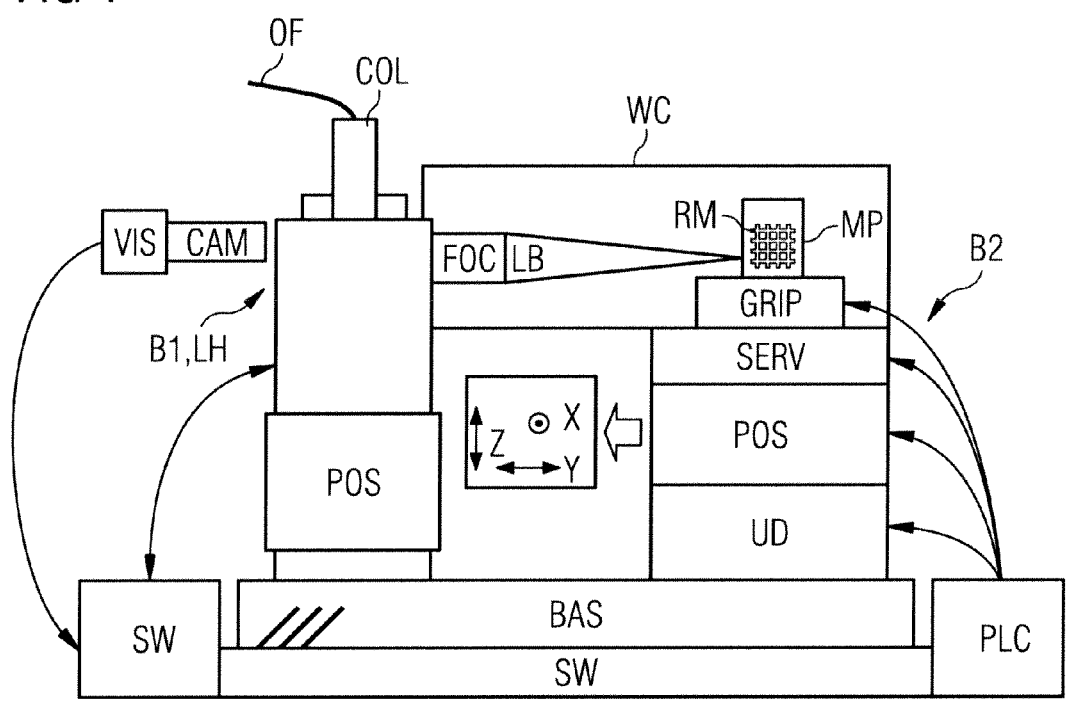
FIG. 1, a system,
FIG. 2, a flow chart of a first program,
FIG. 3, a flow chart of a second program and
FIG. 4, a diagram.

Elements of same construction or function are provided with the same reference signs throughout all figures.

DETAILED DESCRIPTION

According to a first aspect a method and a corresponding device for positioning a first body and a part fixed to a second body with respect to each other, comprises receiving a camera image of a master part used as the part. The master part has a reference marker and is fixed to the second body such that the reference marker is visible in the camera image and the master part is moveable along with the second body. It further comprises determining a first position of a pointer on the master part dependent on the camera image. The pointer is representative for a current position of the first body and is visible in the camera image. The method further comprises controlling a positioning unit to move the pointer from the first position to a predetermined second position with respect to the reference marker dependent on the camera image. The positioning unit is coupled with the first body for moving the first body and the pointer or is coupled with the second body for moving the second body and the master part. The device is adapted to perform this method.

The advantage is that this allows for a fast, precise, reliable and reproducible positioning of the part with respect to the first body and thus allows for a precise processing of a part that is fixed to the second body replacing the master part. The part may then be processed with high precision, for example with a tolerance of some ten micrometers, about a micrometer or even less than a micrometer. It is further possible that the part to process has the reference marker and thus acts as the master part. This allows for an exceptionally precise processing of the part.

According to an embodiment, the method comprises controlling the positioning unit to move the first or the second body or controlling a focusing unit adapted for focusing the pointer to minimize a diameter of the pointer on the master part. By this, a distance of the part with respect to the first body and the focus of the pointer can be adjusted precisely to align the distance and the focus. This allows for a precise processing of the part.

According to a further embodiment, the second body comprises a pointing unit that comprises a laser and the pointer is a reflection of a laser beam emitted by the pointing unit. This is simple, precise and reliable.

In this respect, it is advantageous if the first body is a laser head of a laser welding system. This allows for precise and reliable welding of parts. Further, the laser beam creating the pointer may preferably emitted by the laser head through the same optical path as a laser beam used for welding. This allows for aligning the laser beam used for welding very precisely through aligning the laser beam used for creating the pointer.

According to a further embodiment, prior to the controlling of the positioning unit to move the pointer from the first position to the predetermined second position the master part is checked for a runout. This enables very precise positioning, if such runouts are detected and corrected before the controlling of the positioning unit.

According to a further embodiment, prior to the controlling of the positioning unit to move the pointer from the first position to the predetermined second position or prior to checking the master part for a runout a gripper is checked for a runout. The gripper is comprised by the second body and is adapted to fix the part to the second body. This enables very precise positioning, if such runouts are detected and corrected before the positioning.

According to a further embodiment, the method comprises receiving a camera image of the part that is being fixed to the first body instead of the master part after the positioning of the master part is finished during and/or after processing of the part. The method further comprises monitoring the processing and/or checking a result of the processing dependent on the camera image of the part. By this, scrap can be identified easily during the processing or directly after the processing of the part. A high quality of the resulting processed parts can be achieved.

According to a second aspect a system comprises a first body with a pointing unit for providing a pointer and a camera. The pointer is representative for a current position of the first body and is visible in a camera image of the camera. The system further comprises a second body with a gripper for fixing a part to the second body. The system further comprises a positioning unit being coupled with the first body for moving the first body and the pointer or being coupled with the second body for moving the second body and the part. The system further comprises a device according to the first aspect. The advantages of the first aspect and the advantages of its embodiments also apply to the second aspect accordingly.

In an embodiment of the second aspect, the system is a laser welding system. Precise laser welding of parts is thus possible.

A system comprises a first body B1 and a second body B2 (FIG. 1). The first and the second body B1, B2 preferably are arranged on a basement BAS. Preferably, the system is designed as a laser welding system comprising a welding chamber WC. The first body B1 preferably comprises a laser head LH or is designed as the laser head LH. The laser head LH preferably comprises a collimator COL and a laser or an optical fiber OF that is coupled with a laser and a focusing unit FOC for focusing a laser beam LB. The laser beam LB preferably is a high power laser beam used for welding a part that is arranged in the welding chamber WC.

The first body B1 comprises a vision system VIS comprising a camera CAM. The first body B1 preferably further comprises a pointing unit for providing a pointer POINT. The pointing unit preferably comprises a laser which emits a low power laser beam LB. The pointing unit may be comprised by the laser that generates the high power laser beam LB. Preferably, the high power laser beam LB for welding and the low power laser beam LB for pointing are emitted through essentially the same optical path, that is for example through the optical fiber OF, the collimator COL and the focusing unit FOC on the part arranged in the welding chamber. However, the pointing unit may also be designed differently.

The second body B2 comprises a gripper GRIP which is adapted to hold and fix a part or master part MP to the second body B2. The gripper GRIP preferably is arranged such that the part or master part MP is arranged in the welding chamber WC for welding if it is loaded to the gripper GRIP. Preferably, the second body B2 further comprises a servo unit SERV adapted to rotating the part or master part MP in the welding chamber WC around a longitudinal axis, which is parallel to a direction depicted in FIG. 1 as Z. The second body B2 preferably comprises an up/down positioning unit UD for moving the part or master part MP up and down along the Z-direction. Further, the second body comprises a positioning unit POS for precisely moving the gripper GRIP and thus also the part or master part MP in an X-, Y- and the Z-direction, preferably with a resolution of some ten micrometers, about one micrometer or even less than one micrometer. Alternatively or additionally, the positioning unit POS may be comprised by the first body B1 for moving the laser head LH and particularly the pointing unit in the X-, Y- and Z-direction accordingly.

For controlling the positioning unit POS and preferably also for controlling the gripper GRIP and/or the servo unit SERV and/or the up/down positioning unit UD, a control unit PLC is provided. The control unit PLC may also be called a device for positioning the first body and the part or master part MP fixed to the second body with respect to each other. The control unit PLC may preferably be designed as a programmable logic controller or as a computer. The control unit PLC is adapted to execute a software SW, such as a computer program, for controlling the positioning unit POS and preferably also for controlling the gripper GRIP and/or the servo unit SERV and/or the up/down positioning unit UD and for receiving and preferably processing of a camera image IMG from the camera CAM.

The camera CAM is arranged such that the camera image IMG shows the part or master part MP held in the gripper GRIP and, particularly in case the master part MP is held in the gripper GRIP, shows a reference marker RM and the pointer POINT. The reference marker RM preferably is designed as grid of lines clearly visible in the camera image IMG. However, the reference marker RM can be designed differently. Preferably, only the master part RM, which is not intended for further processing such as welding, has the reference marker RM. But it is also possible that other parts, that is parts intended for further processing such as welding, have the reference marker RM.

Figure 2:
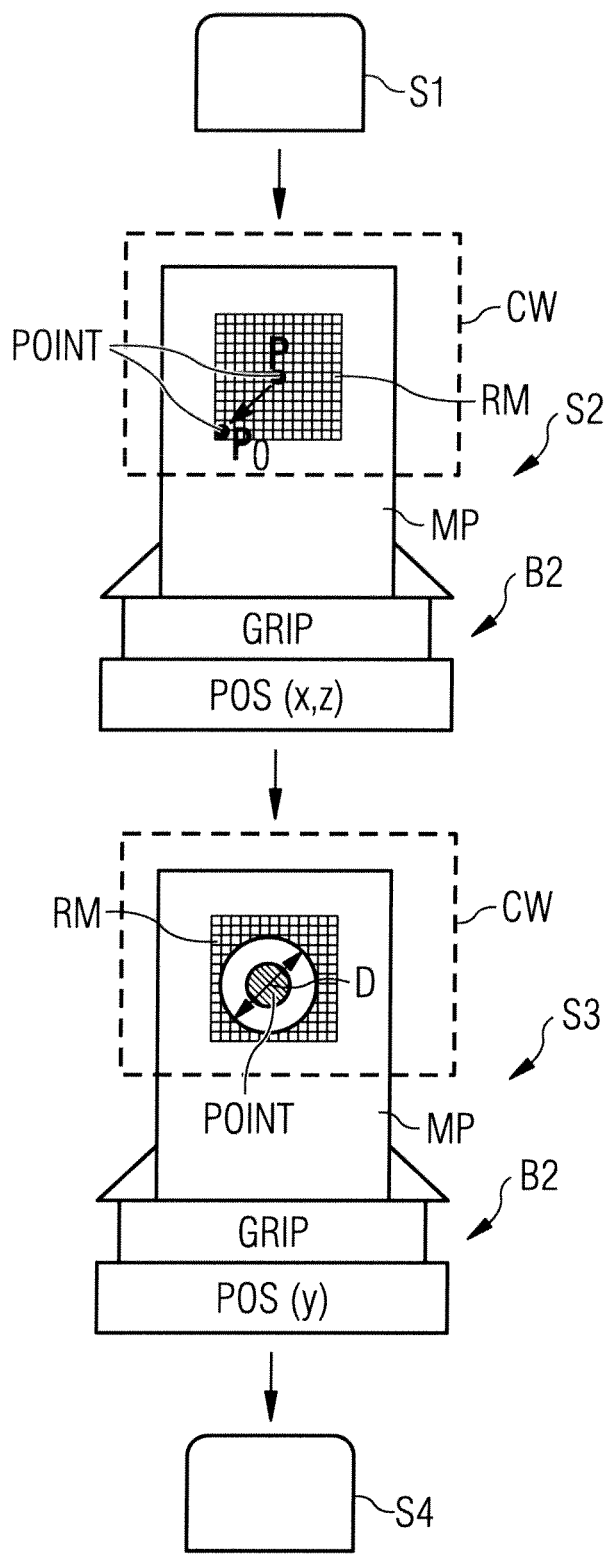

FIG. 2 shows a flow chart of a first program which may be comprised by the software SW as a first embodiment. The program starts in a step S1. In the step S1, for example, the master part MP is arranged in the gripper GRIP. Further, it may be necessary to control the servo unit SERV and/or the up/down positioning unit UD to bring the reference marker RM at least roughly in a predefined position within a camera window CW. In a step S2 and also in other steps, a dashed box indicates as the camera window CW what is seen by the camera CAM and thus what is visible in the camera image IMG. In step S2, then, the positioning unit POS is controlled essentially with respect to the X- and Z-direction to move the pointer POINT from a unaligned starting position PO to an aligned position P with respect to the reference marker RM. For example, the master part MP is moved such with respect to first body that the pointer POINT is centered on the reference marker RM. In other words, the positioning unit POS is controlled with the camera image IMG as a feedback, which allows for very precise positioning.

A step S3 may be provided additionally for aligning a distance between the master part MP and the first body B1 and a focus of the laser beam LB and particularly of the pointer POINT. For this, the positioning unit POS may be controlled essentially with respect to the Y-direction. Alternatively or additionally, the focusing unit FOC may be controlled to focus the laser beam LB on the master part MP. Preferably, the positioning unit POS and/or the focusing unit FOC are controlled dependent on a diameter D of the pointer POINT visible in the camera image IMG. Particularly, the positioning unit POS and/or the focusing unit FOC are controlled to minimize the diameter D. With the pointer POINT having the minimal diameter D it is assumed that the master part MP is in focus. The process performed in the step S3 may also be called autofocusing.

The program ends in a step S4 in which, for example, the master part MP may be unloaded from the gripper GRIP so that other parts may be processed, for example welded.

Figure 3:
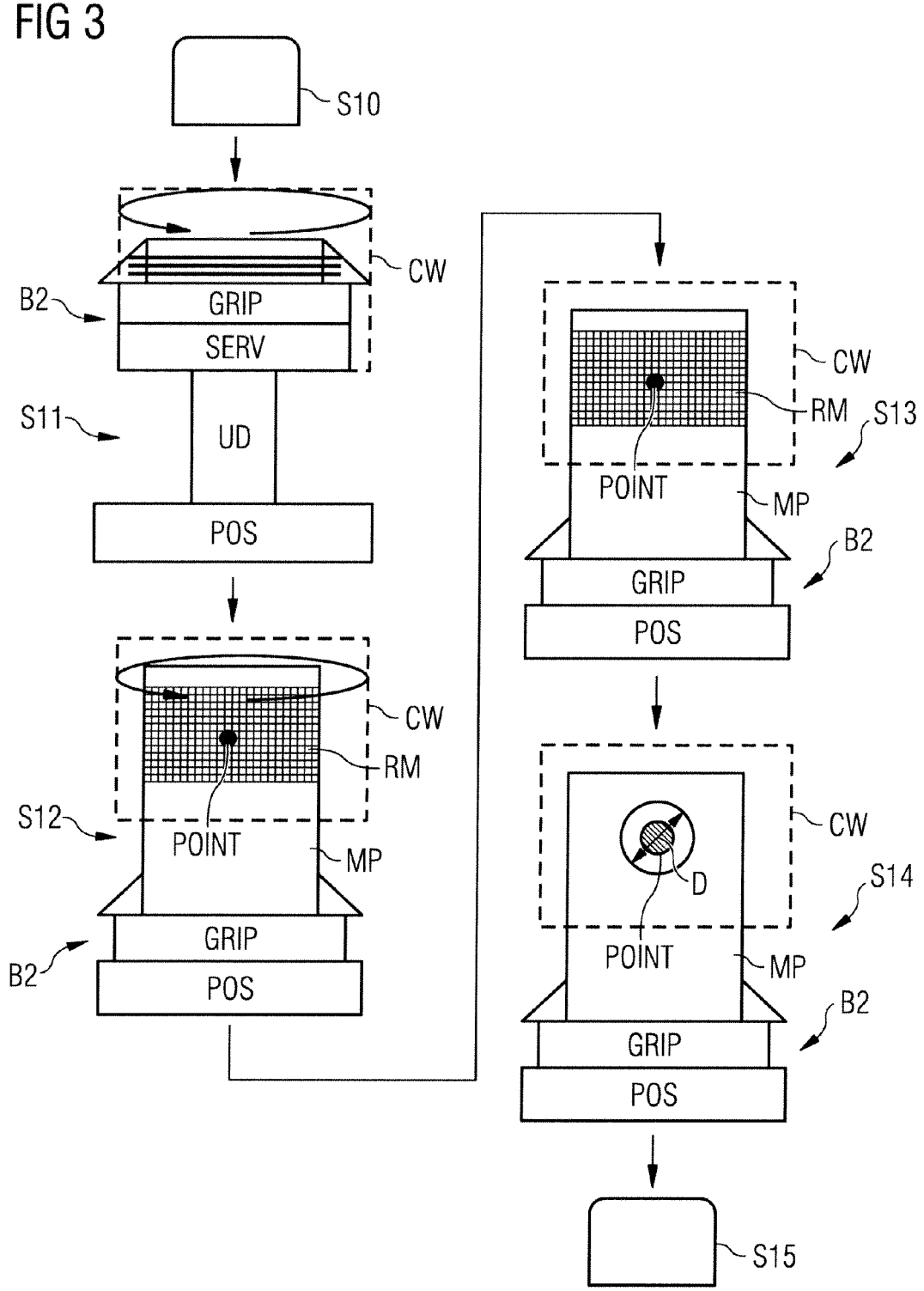

FIG. 3 shows a flow chart of a second program which may be comprised by the software SW as a second embodiment. The program starts with a step S10. In a step S11, a runout check is performed for the gripper GRIP. Preferably, the gripper GRIP is moved with the up/down positioning unit UD such that it is visible within the camera window CW. Preferably, the gripper GRIP is controlled to rotate by the servo unit SERV and the gripper GRIP is checked for the runout preferably dependent on the camera image IMG. If the runout of the gripper GRIP is detected, the program preferably ends.

In a step S12, a runout check is performed for the master part MP. The master part MP is loaded in the gripper GRIP and the servo unit SERV preferably is controlled to rotate the master part MP within the camera window CW. The master part MP is checked for the runout preferably dependent on the camera image IMG. If the runout of the master part MP is detected, the program preferably ends.

Steps S13, S14 and S15 essentially are the same as steps S2, S3 and S4, respectively, of the first embodiment.

Figure 4:
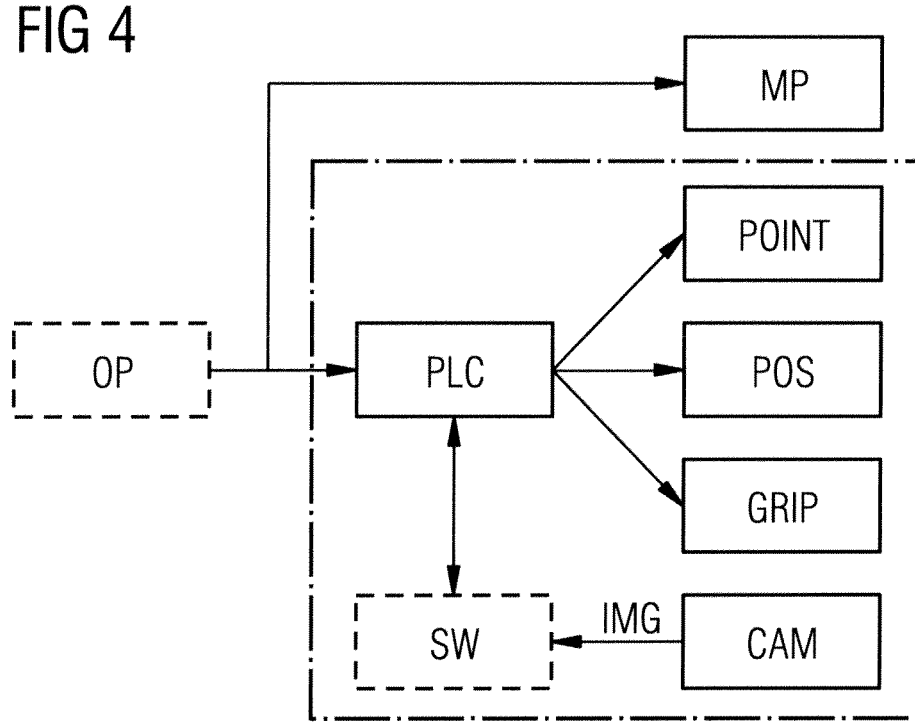

FIG. 4 shows a diagram. An operator OP of the system preferably loads and unloads the master part MP into or from the gripper GRIP and controls the control unit PLC, for example by activating the positioning and autofocusing process explained above. The control unit PLC is coupled with the pointing unit and the positioning unit POS and the gripper GRIP and preferably also with the servo unit SERV for control of these as explained above. The camera CAM sends its camera image IMG to the control unit PLC. The software SW running on the control unit PLC processes the camera image IMG and controls the pointing device, the positioning unit POS, the gripper GRIP and preferably also the servo unit SERV over the control unit PLC. By this, a very precise feedback controlled positioning and autofocusing of parts with respect to the laser head LH is possible automatically.

Because of the part being visible in the camera image IMG, the processing of the part and/or a result of the processing may be monitored and checked. By this, scrap can easily be identified. For this online monitoring and checking, only an amendment of the software SW is necessary, which may be provided as a software upgrade.

What is claimed is:

1. A method for positioning a master part with respect to a laser welding head, comprising the steps of:
   receiving a camera image of the master part, the master part having a reference marker and being fixed to a supporting body such that the reference marker is visible in the camera image and the master part is moveable along with the supporting body,
   emitting a positioning laser beam from the laser welding head onto the reference marker on the master part, such that the positioning laser beam creates a pointer that is visible in the camera image,
   determining a first position of the pointer with respect to the reference marker on the master part based on the camera image, and
   controlling a positioning unit to move either the laser welding head or the supporting body and master part in order to move the pointer from the first position to a predetermined second position with respect to the reference marker based on the camera image,
   emitting a welding laser beam from the laser welding head to perform a welding operation,
   wherein the positioning laser beam and the welding laser beam are emitted by the laser welding head through the same optical path extending from the laser welding head to the master part.

2. The method according to claim 1, comprising the step of controlling the positioning unit to move the first or the supporting body or controlling a focusing unit adapted for focusing the pointer to minimize a diameter of the pointer on the master part.

3. The method according to claim 1, wherein the supporting body comprises a pointing unit that comprises a laser and the pointer is a reflection of a laser beam emitted by the pointing unit.

4. The method according to claim 1, wherein prior to the controlling of the positioning unit to move the pointer from the first position to the predetermined second position the master part is checked for a runout.

5. The method according to claim 1, wherein prior to the controlling of the positioning unit to move the pointer from the first position to the predetermined second position or prior to checking the master part for a runout a gripper is checked for a runout, the gripper being comprised by the supporting body and being adapted to fix the part to the supporting body.

6. The method according to claim 1, comprising
   receiving a camera image of the part that is being fixed to the laser welding head instead of the master part after the positioning of the master part is finished during and/or after processing of the part and monitoring the processing and/or checking a result of the processing dependent on the camera image of the part.

7. A system comprising:

a master part supported by a supporting body and having a reference marker, a laser welding head comprising a laser unit configured to:

emit a positioning laser beam from the laser welding head to create a visible pointer on the reference marker on the master part, and emit a welding laser beam from the laser welding head to perform a welding operation, wherein the positioning laser beam and the welding laser beam are emitted by the laser welding head through the same optical path extending from the laser welding head to the master part, a camera configured to capture an image of the pointer created by the positioning laser beam on the reference marker on the master part, a control unit configured to:

receive the camera image of the pointer visible on the reference marker, determine a first position of the pointer with respect to the reference marker based on the camera image, control a positioning unit to move either the laser welding head or the supporting body and master part in order to move the pointer from the first position to a predetermined second position with respect to the reference marker based on the camera image.

8. The system according to claim 7, wherein:

the system further comprises a gripper configured to fix the master part to the supporting body, and wherein the control unit is further operable to check the gripper for a runout prior to the controlling of the positioning unit to move the pointer from the first position to the predetermined second position.

9. The system according to claim 7, wherein the control unit is further operable to:

receive from the camera a camera image of a part supported by the supporting body part instead of the master part after the positioning of the laser welding head or the supporting body and master part, and monitor the location of the supporting body or master part based on the camera image of the part.

10. The system according to claim 7, wherein the control unit is further operable to control the positioning unit to control a focusing unit adapted for focusing the pointer to minimize a diameter of the pointer on the master part.

11. The system according to claim 7, wherein the control unit is further operable to check the master part for a runout prior to the controlling of the positioning unit to move the pointer from the first position to the predetermined second position.

\* \* \* \* \*